United States Patent
Lee et al.

(10) Patent No.: US 8,259,723 B2
(45) Date of Patent: Sep. 4, 2012

(54) DEVICE AND METHOD FOR GENERATING STATISTICAL INFORMATION FOR VOIP TRAFFIC ANALYSIS AND ABNORMAL VOIP DETECTION

(75) Inventors: Chang-Yong Lee, Seoul (KR); Hwan-Kuk Kim, Seoul (KR); Kyoung-Hee Ko, Incheon (KR); Hyun-Cheol Jeong, Seoul (KR)

(73) Assignee: Korea Internet & Security Agency, Songpagu, Seoul (KR)

( * ) Notice: Subject to any disclaimer, the term of this patent is extended or adjusted under 35 U.S.C. 154(b) by 310 days.

(21) Appl. No.: 12/646,290

(22) Filed: Dec. 23, 2009

(65) Prior Publication Data
US 2011/0058481 A1   Mar. 10, 2011

(30) Foreign Application Priority Data
Sep. 9, 2009   (KR) ........................ 10-2009-0084948

(51) Int. Cl.
*H04L 12/28* (2006.01)
(52) U.S. Cl. .................... 370/392; 370/241; 370/352
(58) Field of Classification Search .................. 370/229, 370/226, 230.1, 230, 231, 232, 233, 234, 370/235, 236, 252, 241, 24, 2, 246, 253, 370/260, 351, 353, 354, 355, 356, 352, 389, 370/392, 400, 401, 402; 709/223, 224, 225, 709/226; 726/13, 23
See application file for complete search history.

(56) References Cited

U.S. PATENT DOCUMENTS
7,254,643 B1 *   8/2007   Peters et al. .................. 709/246
(Continued)

FOREIGN PATENT DOCUMENTS
KR   1020080073006 A   8/2008

OTHER PUBLICATIONS
Office Action, dated Jan. 5, 2011, received in counterpart Korean Patent Application No. 10-2009-0084948, 6 pgs., including English translation.
(Continued)

*Primary Examiner* — Michael Thier
*Assistant Examiner* — Abdullah Riyami
(74) *Attorney, Agent, or Firm* — Holland & Knight, LLP; Brian J. Colandreo, Esq.; Mark H. Whittenberger, Esq.

(57) ABSTRACT

A statistical information generator for VoIP traffic analysis is provided, which comprises a packet collection module collecting packets from a network; and a statistical information generation module analyzing information of a call setup packet or a media packet among the packets collected by the packet collection module, and generating statistical information of the network; wherein if the packet collected by the packet collection module is the call setup packet, the statistical information generation module generates the statistical information of the network using at least one of transmitter identification information, receiver identification information, and call identification information among information of the call setup packet as a key value, while if the packet collected by the packet collection module is the media packet, the statistical information generation module generates the statistical information of the network using media session identification information among information of the media packet as a key value.

12 Claims, 6 Drawing Sheets

U.S. PATENT DOCUMENTS

| | | | |
|---|---|---|---|
| 7,310,334 B1* | 12/2007 | FitzGerald et al. | 370/389 |
| 7,706,291 B2* | 4/2010 | Luft et al. | 370/246 |
| 7,849,506 B1* | 12/2010 | Dansey et al. | 726/22 |
| 2006/0165049 A1* | 7/2006 | Bou-Diab et al. | 370/351 |
| 2007/0268882 A1* | 11/2007 | Breslau et al. | 370/346 |
| 2008/0232269 A1* | 9/2008 | Tatman et al. | 370/252 |
| 2008/0285452 A1* | 11/2008 | Oran | 370/235 |
| 2008/0285463 A1* | 11/2008 | Oran | 370/241 |
| 2009/0010158 A1* | 1/2009 | Filsfils et al. | 370/231 |
| 2009/0168648 A1* | 7/2009 | Labovitz et al. | 370/229 |
| 2010/0085891 A1* | 4/2010 | Kind et al. | 370/253 |
| 2010/0154057 A1* | 6/2010 | Ko et al. | 726/23 |
| 2010/0284282 A1* | 11/2010 | Golic | 370/242 |
| 2010/0299191 A1* | 11/2010 | Fernandez Gutierrez | 705/14.5 |

OTHER PUBLICATIONS

Lee, C-Y., et al., "A VoIP Traffic System based on NetFlow v9," International Journal of Advanced Science and Technology, Mar. 2009, pp. 1-8, V. 4.

English translation of Abstract of KR 1020080073006A, 1 pg.

Lee, C. et al., "A Study on Structure for Monitoring and Detecting VoIP Abnormal Traffic," 2008 Second International Conference on Future Generation Communication and Networking, IEEE Computer Society, vol. 2, pp. 178-182.

Notice of Allowance received in corresponding Korean application No. 1020090084948 mailed Mar. 29, 2012, 5 pgs.

* cited by examiner

| Section | Item | Description |
|---|---|---|
| SIP | Call-ID | Call-ID of corresponding call |
| | From | From URI |
| | To | To URI |
| | Source IP | SIP Source IP |
| | Destination IP | SIP Destination IP |
| | Source IP | SIP Source port |
| | Destination port | SIP Destination port |
| | in/out/inside | inbound/outbound/insdie |
| | In bytes | SIP in bytes |
| | In pkts | SIP in packets |
| | Out bytes | SIP out bytes |
| | Out pkts | SIP out bpackets |
| | Inside bytes | SIP inside bytes |
| | Inside pkts | SIP inside packets |
| | First timestamp | Reception time of first SIP packet of corresponding flow |
| | Last timestamp | Reception time of last SIP packet of corresponding flow |
| SIP cnt | REGISTER count | Counts by methods and status codes |
| | INVITE count | |
| | BYE count | |
| | CANCEL count | |
| | OPTION count | |
| | ACK count | |
| | other method count | |
| | 1xx count | |
| | 200OK count | |
| | 3xx count | |
| | 4xx count | |
| | 5xx count | |
| | 6xx count | |

FIG. 5

| Section | Item | Description |
| --- | --- | --- |
| RTP | RTP src IP<br>RTP dest IP<br>RTP source port<br>RTP destination port<br>RTP Codec<br>RTP in bytes<br>RTP in pkts<br>RTP out bytes<br>RTP out pktes<br>RTP inside bytes<br>RTP inside pkts<br>RTP First timestamp<br>RTP Last timestamp | RTP Source IP<br>RTP Destination IP<br>RTP Source port<br>RTP Destination port<br>RTP Code information<br>RTP in bytes<br>RTP in packets<br>RTP out bytes<br>RTP out packets<br>RTP inside bytes<br>RTP inside packets<br>Reception time of first RTP packet of corresponding flow<br>Reception time of last RTP packet of corresponding flow |
| RTP QoS | RTP in Delay<br>RTP out Delay<br>RTP inside Delay<br>RTP in Jitter<br>RTP out Jitter<br>RTP inside Jitter<br>RTP in PKT loss<br>RTP out PKT loss<br>RTP inside PKT loss | RTP traffic QoS information |

FIG. 6

| Section | Item | Description |
|---|---|---|
| Sensor | Sensor IP | Item IP |
| SIP | Call-ID<br>From<br>To<br>Source IP<br>Destination IP<br>Source IP<br>Destination port<br>in/out/inside<br>In bytes<br>In pkts<br>Out bytes<br>Out pkts<br>Inside bytes<br>Inside pkts<br>First timestamp<br>Last timestamp | Call-ID of corresponding call<br>From URI<br>To URI<br>SIP Source IP<br>SIP Destination IP<br>SIP Source port<br>SIP Destination port<br>inbound/outbound/insdie<br>SIP in bytes<br>SIP in packets<br>SIP out bytes<br>SIP out bpackets<br>SIP inside bytes<br>SIP inside packets<br>Reception time of first SIP packet of corresponding flow<br>Reception time of last SIP packet of corresponding flow |
| SIP cnt | REGISTER count<br>INVITE count<br>BYE count<br>CANCEL count<br>OPTION count<br>ACK count<br>other method count<br>1xx count<br>200OK count<br>3xx count<br>4xx count<br>5xx count<br>6xx count | Counts by methods and status codes |
| RTP | RTP src IP<br>RTP dest IP<br>RTP source port<br>RTP destination port<br>RTP Codec<br>RTP in bytes<br>RTP in pkts<br>RTP out bytes<br>RTP out pktes<br>RTP inside bytes<br>RTP inside pkts<br>RTP First timestamp<br>RTP Last timestamp | RTP Source IP<br>RTP Destination IP<br>RTP Source port<br>RTP Destination port<br>RTP Code information<br>RTP in bytes<br>RTP in packets<br>RTP out bytes<br>RTP out packets<br>RTP inside bytes<br>RTP inside packets<br>Reception time of first RTP packet of corresponding flow<br>Reception time of last RTP packet of corresponding flow |
| RTP QoS | RTP in Delay<br>RTP out Delay<br>RTP inside Delay<br>RTP in Jitter<br>RTP out Jitter<br>RTP inside Jitter<br>RTP in PKT loss<br>RTP out PKT loss<br>RTP inside PKT loss | RTP traffic QoS information |

DEVICE AND METHOD FOR GENERATING STATISTICAL INFORMATION FOR VOIP TRAFFIC ANALYSIS AND ABNORMAL VOIP DETECTION

RELATED APPLICATION

This application is based on and claims priority from Korean Patent Application No. 10-2009-0084948, filed on Sep. 9, 2009, in the Korean Intellectual Property Office, the disclosure of which is incorporated herein in its entirety by reference.

BACKGROUND OF THE INVENTION

1. Field of the Invention

The present invention relates to a device and a method for generating statistical information. More particularly, the present invention relates to a device and a method for generating statistical information for VoIP (Voice over Internet Protocol) traffic analysis and abnormal attacking VoIP detection.

2. Description of the Prior Art

In general, traffic itself is an important property of a network service provider, is a means for monitoring a network state, and is an important factor in the generation of network design data.

On the other hand, with the spread of Internet phones and so on, the necessity of analyzing traffic on a network has been increased, and thus a traffic monitoring technique has also been developed. Such traffic monitoring may be performed to simply grasp the network state and/or may be performed to grasp abnormal traffic, find vulnerability of the network, and take preventive measures against the vulnerability.

As such a traffic monitoring technique, a monitoring technique based on a flow, which is a set of packets between two end points on a network, has been mainly used due to the high-speed network. According to "Netflow" of Cisco Systems, Inc. which is the representative of the flow-based monitoring method, a router measures the flow of packets at a flow level.

Recently, Cisco Systems, Inc. has announced "Netflow V9 (Version 9)" that enables a user to configure a template and to monitor diverse traffic information on the network. However, the existing generator generates the netflow based on 5-tuple information (e.g. a transmitter IP, a receiver IP, a transmitter port, a receiver port, and a protocol), and thus it cannot properly use the Netflow V9.

That is, with the spread of Internet phones and a NAT environment, the current VoIP traffic can be accurately analyzed through the generation of statistical information (e.g. netflow) based on additional information, such as a transmitter URI, a receiver URI, and the like, in addition to the existing 5-tuple information. However, the existing generator does not support this, and thus there is a difficulty in performing a reliable VoIP traffic analysis.

SUMMARY OF THE INVENTION

Accordingly, the present invention has been made to solve the above-mentioned problems occurring in the prior art, and a subject of the present invention is to provide a statistical information generator for reliable analysis of VoIP (Voice over Internet Protocol) traffic and detection of abnormal attacking VoIP.

Another subject of the present invention is to provide a method for generating statistical information for reliable analysis of VoIP traffic.

Additional advantages, objects, and features of the invention will be set forth in part in the description which follows and in part will become apparent to those having ordinary skill in the art upon examination of the following or may be learned from practice of the invention.

In order to accomplish these subjects, there is provided a statistical information generator for VoIP (Voice over Internet Protocol) traffic analysis, according to an embodiment of the present invention, which includes a packet collection module collecting packets from a network; and a statistical information generation module analyzing information of a call setup packet or a media packet among the packets collected by the packet collection module, and generating statistical information of the network; wherein if the packet collected by the packet collection module is the call setup packet, the statistical information generation module generates the statistical information of the network using at least one of transmitter identification information, receiver identification information, and call identification information among information of the call setup packet as a key value, while if the packet collected by the packet collection module is the media packet, the statistical information generation module generates the statistical information of the network using media session identification information among information of the media packet as a key value.

In another aspect of the present invention, there is provided a method for generating statistical information for VoIP (Voice over Internet Protocol) traffic analysis, which includes collecting packets from a network; and analyzing information of a call setup packet or a media packet among the collected packets, and generating statistical information of the network; wherein the statistical information of the network is generated using at least one of transmitter identification information, receiver identification information, and call identification information among information of the call setup packet as a key value, and the statistical information of the network is generated using media session identification information among information of the media packet as a key value.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures. Also, the term "and/or" includes the respective described items and combinations thereof.

In the following description of the present invention, the terms used are for explaining embodiments of the present invention, but do not limit the scope of the present invention. In the description, a singular expression may include a plural expression unless specially described. The term "comprises" and/or "made of" used in the description means that one or more other components, steps, operation and/or existence or addition of elements are not excluded in addition to the described components, steps, operation and/or elements.

In the following description of the present invention, embodiments of the present invention will be described with reference to configuration diagrams and flowcharts which are ideal schematic diagrams. The form of exemplary diagrams may be modified due to the manufacturing techniques and/or limited conditions. Accordingly, the embodiments of the present invention are not limited to their specified form as illustrated, but include changes in form being produced according to manufacturing processes. Accordingly, configurations exemplified in the drawings have rough properties, and are to exemplify specified forms of elements, but do not limit the scope of the present invention.

Unless specially defined, all terms (including technical and scientific terms) used in the description could be used as meanings commonly understood by those ordinary skilled in the art to which the present invention belongs. In addition, terms that are generally used but are not defined in the dictionary are not interpreted ideally or excessively unless they have been clearly and specially defined.

Hereinafter, with reference to FIGS. 1 to 6, a statistical information generator for VoIP (Voice over Internet Protocol) traffic analysis according to an embodiment of the present invention will be described. For convenience in explanation, the configuration of the statistical information generator for VoIP traffic analysis according to an embodiment of the present invention will be described, and then the operation thereof will be described.

First, with reference to FIGS. 1 and 2, the configuration of the statistical information generator for VoIP traffic analysis according to an embodiment of the present invention will be described.

Figure 1:
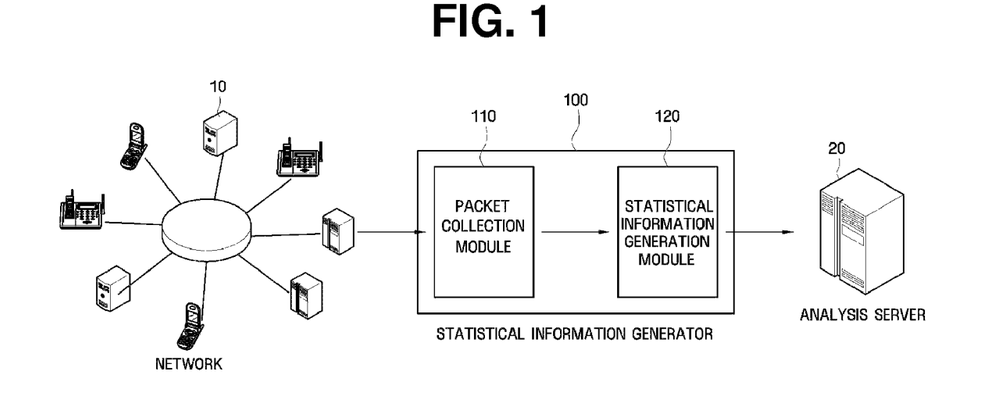
FIG. 1 is a view illustrating the configuration of a statistical information generator for VoIP traffic analysis according to an embodiment of the present invention.
Figure 2:
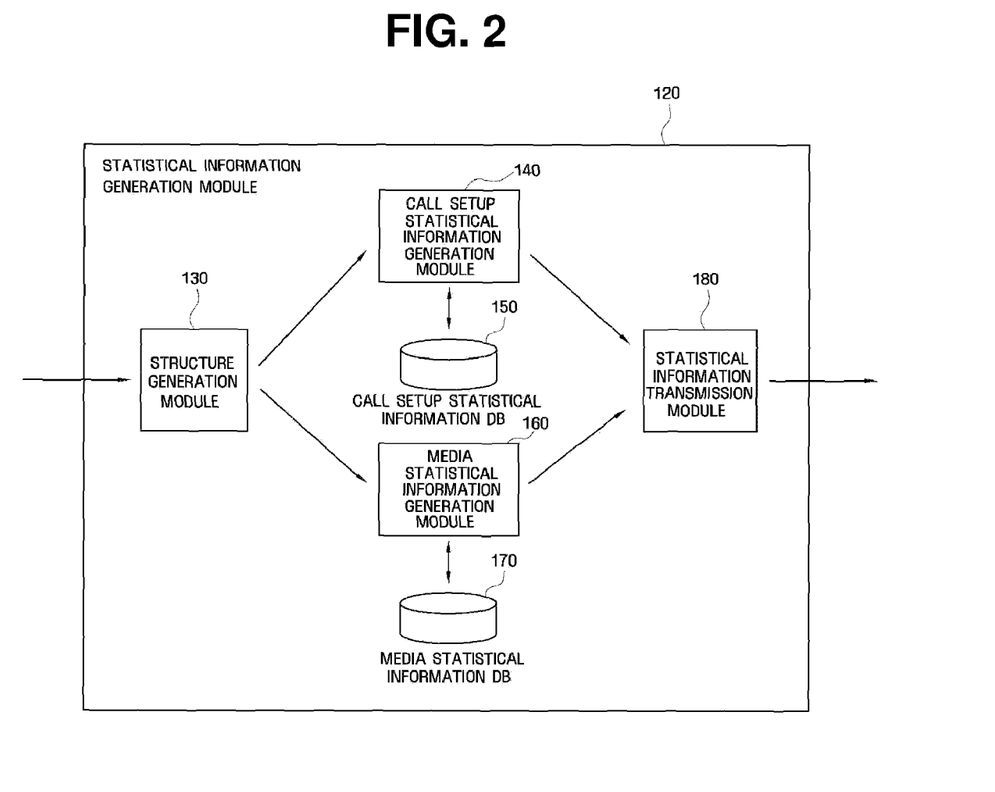
FIG. 2 is a view illustrating the configuration of a statistical information generation module of a statistical information generator for VoIP traffic analysis according to an embodiment of the present invention.

FIG. 1 is a view illustrating the configuration of a statistical information generator for VoIP traffic analysis according to an embodiment of the present invention, and FIG. 2 is a view illustrating the configuration of a statistical information generation module of a statistical information generator for VoIP traffic analysis according to an embodiment of the present invention.

Referring to FIG. 1, a statistical information generator 100 for VoIP traffic analysis according to an embodiment of the present invention includes a packet collection module 110 and a statistical information generation module 120.

The packet collection module 110 is a module that collects packets from a network 10, and transfers the collected packets to the statistical information generation module 120. In the network 10, various kinds of terminals, such as a server, a router, a phone, and the like, are connected together to send/receive diverse packets for the communications between them, and the packet collection module 110 collects such diverse packets and transfers the collected packets to the statistical information generation module 120.

In particular, the network 10 according to an embodiment of the present invention may be, for example, an Internet phone network in which VoIP traffic exists. The packet collection module 110 may be a module that collects all packets related to the VoIP traffic on the network 10, and transfers the collected packets to the statistical information generation module 120.

The statistical information generation module 120 is a module which receives the packets collected by and transferred from the packet collection module 110, generates statistical information of the network 10 by analyzing information of a call setup packet or a media packet among the received packets, and then transmits the statistical information to an analysis server 20 for the analysis of the VoIP traffic of the network 10.

Specifically, the statistical information generation module 120 is a module which generates the statistical information of the network 10 using at least one of transmitter identification information, receiver identification information, and call identification information among the information of the call setup packet as a key value, or generates the statistical information of the network 10 using media session identification information among information of the media packet as a key value. Then, the statistical information generation module 120 transmits the statistical information to the analysis server 20 for the analysis of the VoIP traffic of the network 10. The features of the statistical information generation module 120 will be described in more detail with reference to FIG. 2.

Referring to FIG. 2, the statistical information generation module 120 includes a structure generation module 130, a call setup statistical information generation module 140, a media statistical information generation module 160, and a statistical information transmission module 180.

The structure generation module 130 receives the packets collected by the packet collection module 110 in FIG. 1, classifies the packets into call setup packets and media packets. If the received packet is a call setup packet, the structure generation module 130 generates a call setup information structure by analyzing information of the call setup packet, while if the received packet is a media packet, the structure generation module 130 generates a media information structure by analyzing information of the media packet.

Here, the call setup packet according to an embodiment of the present invention may be an SIP (Session Initiation Protocol) packet, and the media packet may be an RTP (Real-time Transport Protocol) packet. However, this is merely exemplary, and the present invention is not limited thereto. The structure generation module 130 according to an embodiment of the present invention can generate a call setup information structure or a media information structure by analyzing header information and payload information of the call setup packet or the media packet.

The call setup information structure generated by the structure generation module 130 is provided to the call setup statistical information generation module 140, and the media information structure is provided to the media statistical information generation module 160.

The call setup statistical information generation module 140 is a module which receives the call setup information structure from the structure generation module 130, and generates call setup statistical information by combining the provided call setup information structures using at least one of transmitter identification information, receiver identification information, and call identification information among information of the call setup information structure as a key value.

Specifically, the call setup statistical information generation module 140 is a module which generates the call setup statistical information by combining the provided call setup information structures using at least one of transmitter identification information, receiver identification information, and call identification information as a key value, in addition to 5-tuple information (including a transmitter IP, a receiver IP, a transmitter port, a receiver port, and a protocol) of the call setup information structure.

Here, the call setup information structure according to an embodiment of the present invention may be an SIP information structure, and the transmitter identification information may be transmitter URI information (hereinafter indicated as "From"). Also, the receiver identification information may be receiver URI information (hereinafter indicated as "To"), and the call identification information may be call-ID information. Also, the call setup statistical information may be SIP statistical information. However, this is merely exemplary, and the present invention is not limited thereto.

Using call setup statistical information DB 150, the call setup statistical information generation module 140 can generate the call setup statistical information by combining the call setup information structures. Here, the call setup statistical information DB 150 may be, for example, a hash table implemented on a memory. The detailed operation of the call setup statistical information generation module 140, which generates the call setup statistical information by combining the call setup information structures using the call setup statistical information DB 150, will be described later in the following description of the operation of the statistical information generator according to an embodiment of the present invention.

The media statistical information generation module 160 is a module which receives the media information structure from the structure generation module 130, and generates media statistical information by combining the provided media information structures using media session identification information among information of the media information structure as a key value.

Specifically, the media statistical information generation module 160 is a module which generates the media statistical information by combining the provided media information structures using the media session identification information as a key value, in addition to the 5-tuple information (including a transmitter IP, a receiver IP, a transmitter port, a receiver port, and a protocol) of the media information structure.

Here, the media information structure according to an embodiment of the present invention may be an RTP information structure, and the media session identification information may be SSRC information. In addition, the media statistical information may be RTP statistical information. However, this is merely exemplary, and the present invention is not limited thereto.

Using media statistical information DB 170, the media statistical information generation module 160 can generate the media statistical information by combining the media information structures. Here, the media statistical information DB 170 may be, for example, a hash table implemented on a memory in the same manner as the call setup statistical information DB 150. The detailed operation of the media statistical information generation module 160, which generates the media statistical information by combining the media information structures using the media statistical information DB 170, will be described later in the following description of the operation of the statistical information generator according to an embodiment of the present invention.

The statistical information transmission module 180 is a module which receives the call setup statistical information or the media statistical information from the call setup statistical information generation module 140 or the media statistical information generation module 160, generates statistical information of the network 10 in FIG. 1 in the form that can be analyzed by the analysis server 20 in FIG. 1, and transmits the generated statistical information to the analysis server 20 in FIG. 1.

Here, the statistical information of the network 10 in FIG. 1 according to an embodiment of the present invention may be a netflow of Cisco Systems, Inc. More specifically, the statistical information of the network may be a netflow following Netflow V9 format of Cisco Systems, Inc. However, this is merely exemplary, and the present invention is not limited thereto.

Next, with reference to FIGS. 3 to 6, the operation of the statistical information generator for VoIP traffic analysis according to an embodiment of the present invention will be described.

Here, for convenience in explanation, it is exemplified that the call setup packet is an SIP packet, the media packet is an RTP packet, the call setup information structure is an SIP information structure, the media information structure is an RTP information structure, the transmitter identification information is "From" information, the receiver identification information is "To" information, the call identification information is call-ID information, the media session identification information is SSRC information, the call setup statistical information is SIP statistical information, the media statistical information is RTP statistical information, and the statistical information of the network is a netflow. However, this is merely exemplary, and the present invention is not limited thereto.

Figure 3:
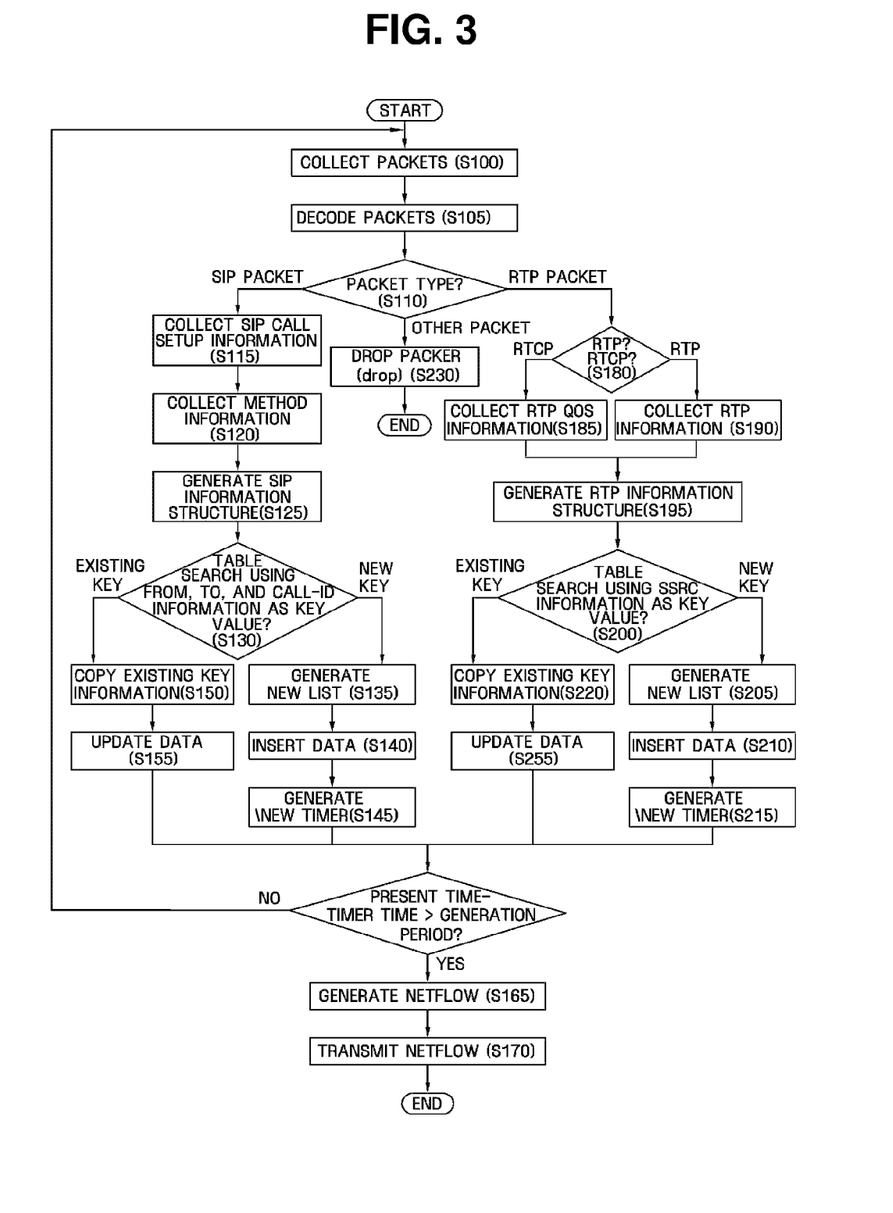
FIG. 3 is a flowchart illustrating the operation of a statistical information generator for VoIP traffic analysis according to an embodiment of the present invention.
Figure 4:
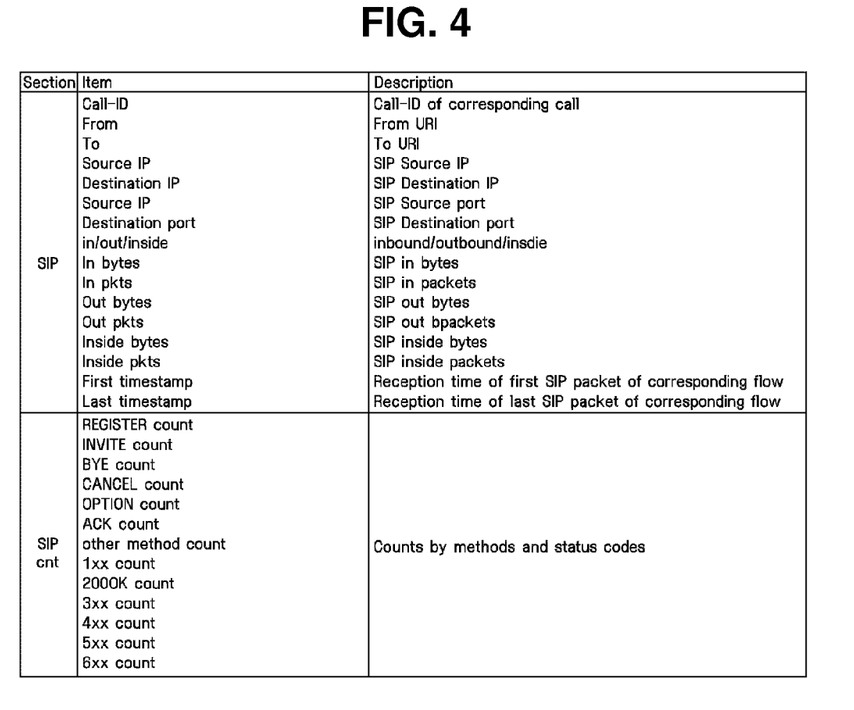
FIG. 4 is a view illustrating an example of an SIP information structure generated by a structure generation module of a statistical information generator for VoIP traffic analysis according to an embodiment of the present invention.
Figure 5:
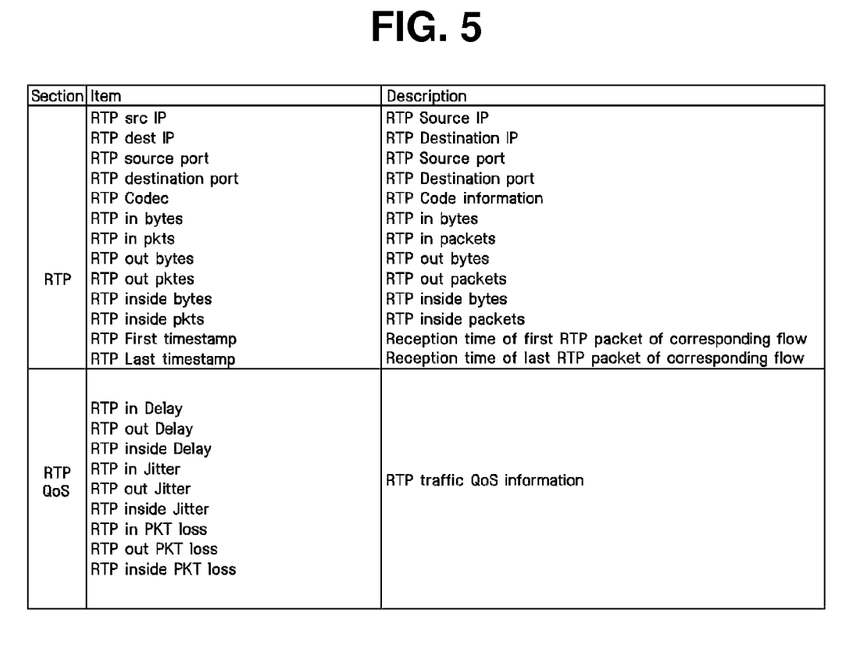
FIG. 5 is a view illustrating an example of an RTP information structure generated by a structure generation module of a statistical information generator for VoIP traffic analysis according to an embodiment of the present invention.
Figure 6:
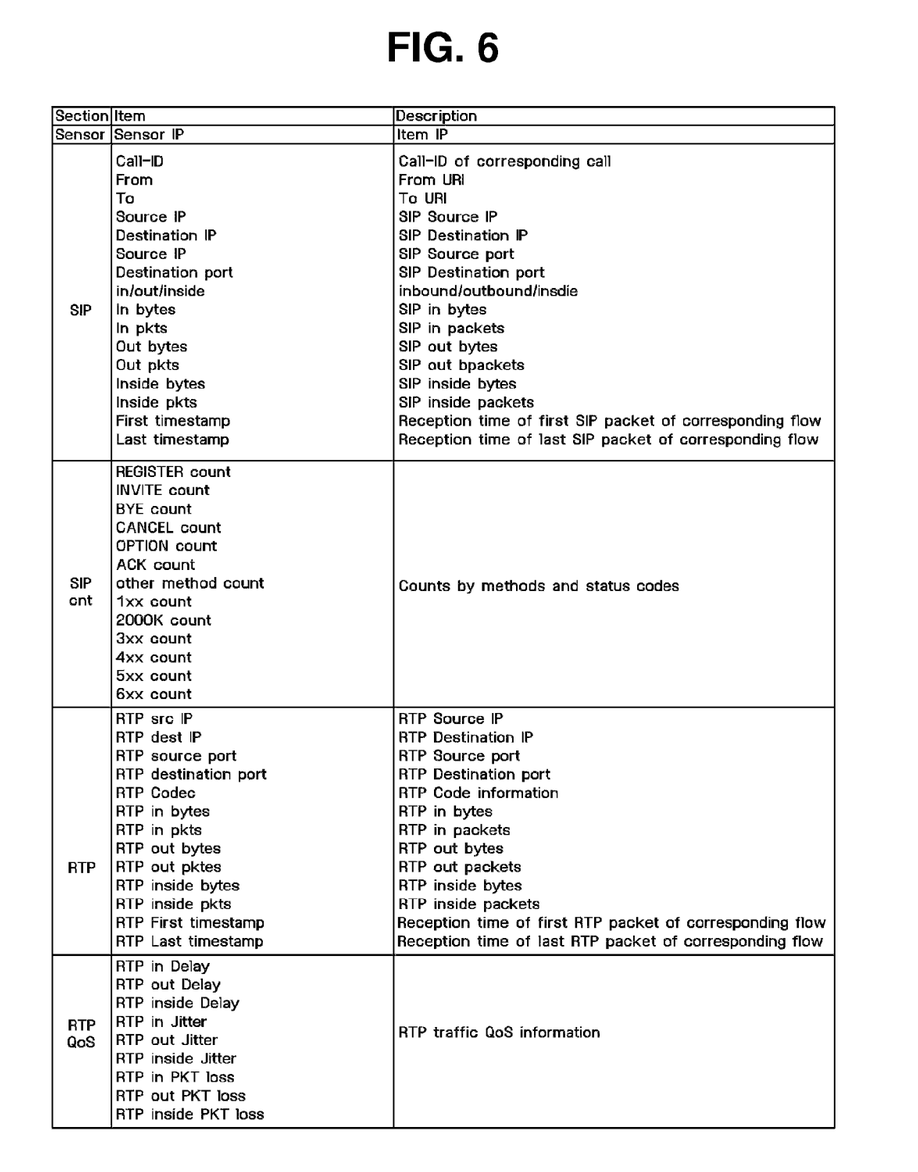
FIG. 6 is a view illustrating an example of netflow generated by a statistical information generator for VoIP traffic analysis according to an embodiment of the present invention.

FIG. 3 is a flowchart illustrating the operation of a statistical information generator for VoIP traffic analysis according to an embodiment of the present invention. FIG. 4 is a view illustrating an example of an SIP information structure generated by a structure generation module of a statistical information generator for VoIP traffic analysis according to an embodiment of the present invention, and FIG. 5 is a view illustrating an example of an RTP information structure generated by a structure generation module of a statistical information generator for VoIP traffic analysis according to an embodiment of the present invention. FIG. 6 is a view illustrating an example of a netflow generated by a statistical information generator for VoIP traffic analysis according to an embodiment of the present invention.

First, referring to FIG. 3, packets are collected from a network S100.

Specifically, the packet collection module 110 in FIG. 1 collects packets from the network 10 in FIG. 1.

Then, referring to FIG. 3, the collected packets are decoded, and an SIP packet and an RTP packet are extracted from the collected packets S105 and S110.

Specifically, the structure generation module 130 in FIG. 2 receives the collected packets from the packet collection module 110 in FIG. 1, decodes (e.g. parses) the received packets, and extracts the SIP packet and the RTP packet by analyzing the decoded information.

Here, since the next operation of the statistical information generator for VoIP traffic analysis according to an embodiment of the present invention is divided depending on whether the extracted packet is the SIP packet or the RTP packet, for convenience in explanation, the case in which the SIP packet is extracted, the case in which the RTP packet is extracted, and the case in which a packet rather than the SIP or RTP packet is extracted will be described in order.

Referring to FIGS. 3 and 4, in the case in which the SIP packet is extracted, SIP call setup information and method information are collected by analyzing the extracted SIP packet, and an SIP information structure is generated S115, S120, and S125.

Specifically, the structure generation module 130 in FIG. 2 collects the SIP call setup information and the method information from the extracted SIP packet information, and generates the SIP information structure as shown in FIG. 4. Here, although 5-tuple information is not illustrated in FIG. 4, the SIP information structure according to another embodiment of the present invention may basically include the 5-tuple information. That is, the present invention is not limited to the construction of the SIP information structure as illustrated in FIG. 4.

Next, referring to FIGS. 3 and 6, a table is searched using at least one of "From" information, "To" information, and call-ID information of the SIP information structure as a key value. If the information refers to a new key value, a new list having the new key value is generated, a new information structure is inserted, and then a new timer is generated S130, S135, S140, and S145. Then, the present time and the time generated by the timer are compared with each other, and if a difference between them is smaller than a netflow generation period, the combining of the SIP information structures continues, while if the difference is larger than the netflow generation period, the SIP statistical information is generated based on the combined SIP information structures. Then, based on this, the netflow is generated and transmitted S160, S165, and S170. If an existing key is in the table as a result of searching the table using the "From" information, "To" information, and call-ID information of the generated SIP information structure as a key value, information existing in the table related to the corresponding key is copied, and data is updated by reflecting the contents of the newly generated SIP information structure S130, S150, and S155. In addition, the present time and the time generated by the existing timer are compared with each other, and if the difference between them is smaller than the netflow generation period, the combining of the SIP information structures continues, while if the difference is larger than the netflow generation period, the SIP statistical information is generated based on the combined SIP information structures. Then, based on this, the netflow is generated and transmitted S160, S165, and S170.

Specifically, the call setup statistical information generation module 140 in FIG. 2 searches a hash table of the call setup statistical information DB 150 in FIG. 2 using at least one of "From" information, "To" information, and call-ID information as a key value, in addition to the 5-tuple information of the SIP information structure generated by the structure generation module 130 in FIG. 2. If the information refers to a new key value that is not in the table, the call setup statistical information generation module 140 generates a new list having the new key value in the call setup statistical information DB 150 in FIG. 2, inserts a new information structure into the list, and then generates a new timer to interlock with the newly generated list. If the key value exists in the table, the call setup statistical information generation module 140 in FIG. 2 copies the information in the existing table related to the corresponding key, and updates the data by reflecting the contents of the newly generated SIP information structure.

The call setup statistical information generation module 140 in FIG. 2 repeats the process of combining the SIP information structures as described above for a netflow generation period (e.g. 30 seconds), and generates the SIP statistical information based on the combined SIP information structures. That is, the call setup statistical information generation module 140 in FIG. 2 combines the SIP information structures having the same 5-tuple information, "From" information, "To" information, and call-ID information for the netflow generation period (e.g. 30 seconds) after another SIP information structure having at least one information different from the 5-tuple information, "From" information, "To" information, and call-ID information, and generates the SIP statistical information based on this.

The SIP statistical information generated through combining of the SIP information structures by the call setup statistical information generation module 140 in FIG. 2 for the netflow generation period is provided to the statistical information transmission module 180 in FIG. 2, and the statistical information transmission module 180 generates the netflow in the form as illustrated in FIG. 6, which can be analyzed by the analysis server 20 in FIG. 1 based on the provided SIP statistical information, to transmit the generated netflow to the analysis server 20 in FIG. 1.

Here, although the 5-tuple information is not illustrated in FIG. 6, the netflow generated by the statistical information transmission module 180 in FIG. 2 according to another embodiment of the present invention may basically include the 5-tuple information. That is, the present invention is not limited to the construction of the netflow as illustrated in FIG. 6. In addition, the netflow generated by the statistical information transmission module 180 in FIG. 2 may be, but is not limited to, the netflow following the Netflow V9 formation of Cisco Systems, Inc.

Next, referring to FIGS. 3 and 5, in the case in which the RTP packet is extracted, whether the extracted RTP packet is an RTCP packet or an RTP packet is discriminated through analysis of the extracted RTP packet. If the extracted RTP packet is an RTCP packet, RTP QoS information is collected, while if the extracted RTP packet is an RTP packet, RTP information structures are generated by collecting the RTP information S180, S185, S190, and S195.

Specifically, the structure generation module 130 in FIG. 2 discriminates whether the extracted RTP packet is the RTCP packet or the RTP packet by decoding the RTP packet information, and if the extracted RTP packet is the RTCP packet, it collects the RTP OoS information, while if the extracted RTP packet is the RTP packet, it generates the RTP information structures as illustrated in FIG. 5 by collecting the RTP information. Here, although 5-tuple information is not illustrated in FIG. 5, the RTP information structure according to another embodiment of the present invention may basically include the 5-tuple information. That is, the present invention is not limited to the construction of the RTP information structure as illustrated in FIG. 5.

Next, referring to FIGS. 3 and 6, a table is searched using the SSRC information of the generated RTP information structure as a key value. If the information refers to a new key value, a new list having the new key value is generated, a new information structure is inserted, and then a new timer is generated S200, S205, S210, and S215. Then, the present time and the time generated by the timer are compared with each other, and if a difference between them is smaller than a netflow generation period, the combining of the RTP information structures continues, while if the difference is larger than the netflow generation period, the RTP statistical information is generated based on the combined RTP information structures. Then, based on this, the netflow is generated and transmitted S160, S165, and S170. If an existing key is in the table as a result of searching the table using the SSRC information of the generated RTP information structure as a key value, information existing in the table related to the corresponding key is copied, and data is updated by reflecting the contents of the newly generated RTP information structure S200, S220, and S225. In addition, the present time and the time generated by the existing timer are compared with each other, and if the difference between them is smaller than the netflow generation period, the combining of the RTP information structures continues, while if the difference is larger than the netflow generation period, the RTP statistical information is generated based on the combined RTP information structures. Then, based on this, the netflow is generated and transmitted S160, S165, and S170.

Since the detailed description thereof, except for the generation of the netflow based on the RTP information structure using the SSRC information of the RTP information structure as a key value, rather than the "From" information, "To" information, and call-ID information of the SIP information structure, is identical to that in the generation of the netflow based on the SIP information structure, it will be omitted.

Then, referring to FIG. 3, if a packet that is not the SIP packet or the RTP packet, the corresponding packet is dropped S230.

Specifically, if it is judged that the corresponding packet is not the SIP packet or the RTP packet from the extracted packet information, the structure generation module 130 in FIG. 2 drops the corresponding packet.

As described above, the statistical information generator for VoIP traffic analysis according to an embodiment of the present invention generates the statistical information (e.g. the netflow) using the call setup (e.g. SIP) information including at least one of the transmitter identification information (e.g. the "From" information), the receiver identification information (e.g. the "To" information), and the call identification information (e.g. the call-ID information) in an application end and/or media (e.g. RTP) information such as media session identification information (e.g. SSRC information) as a key value, in addition to the existing 5-tuple information (including a transmitter IP, a receiver IP, a transmitter port, a receiver port, and a protocol). Accordingly, the traffic between callers or phone numbers, rather than the existing specified IPs, can be analyzed, and thus the VoIP traffic of Internet phone users in a NAT environment and so on can be more reliably analyzed.

In addition, the statistical information generator for VoIP traffic analysis according to an embodiment of the present invention generates statistical information (e.g. the netflow) including diverse traffic information of an application end, such as SIP and RTP, and thus a high convenience can be provided in the process of monitoring the VoIP traffic and detecting an abnormal VoIP traffic through an analysis server and so on.

Since the contents of the method for generating statistical information for VoIP traffic analysis according to an embodiment of the present invention can be fully analogized by one skilled in the art in view of the description of the operation of the statistical information generator for VoIP according to an embodiment of the present invention, the detailed description of the contents and effect thereof will be omitted.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A statistical information generator for VoIP (Voice over Internet Protocol) traffic analysis, comprising:
    a packet collection module collecting packets from a network; and
    a statistical information generation module analyzing information of a call setup packet or a media packet among the packets collected by the packet collection module, and generating statistical information of the network;
    wherein the statistical information generation module comprises:
    a structure generation module receiving the packets collected by the packet collection module, classifying the packets into the call setup packet and the media packet, generating a call setup information structure by analyzing information of the call setup packet if the received packet is the call setup packet, and generating a media information structure by analyzing information of the media packet if the received packet is the media packet;
    a call setup statistical information generation module receiving the call setup information structure from the structure generation module, and generating call setup statistical information by combining the call setup information structures using at least one of transmitter identification information, receiver identification information, and call identification information among information of the call setup information structure as a key value;
    a media statistical information generation module receiving the media information structure from the structure generation module, and generating media statistical information by combining the media information structures using media session identification information among information of the media information structure as a key value; and
    a statistical information transmission module receiving the generated call setup statistical information or the media statistical information from the call setup statistical information generation module or the media statistical information generation module, generating the statistical information of the network, and transmitting the statistical information to an analysis server.

2. The statistical information generator of claim 1, wherein the call setup packet comprises an SIP packet and the media packet comprises an RTP packet.

3. The statistical information generator of claim 1, wherein the transmitter identification information comprises transmitter URI information, and the receiver identification information comprises receiver URI information, the call identification information comprises call-ID information, and the media session identification information comprises SSRC information.

4. The statistical information generator of claim 1, wherein the statistical information of the network comprises a netflow.

5. The statistical information generator of claim 4, wherein the netflow is a netflow following Netflow V9 format.

6. The statistical information generator of claim 1, wherein the call setup statistical information generation module generates the call setup statistical information by combining the call setup information structures for a predetermined period and the media statistical information generation module generates the media statistical information by combining the media information structures for a predetermined period.

7. The statistical information generator of claim 1, wherein the structure generation module generates the call setup information structure or the media information structure by analyzing header information and payload information of the call setup packet or the media packet.

8. A method for generating statistical information for VoIP (Voice over Internet Protocol) traffic analysis, comprising:
   collecting by a packet collection module packets from a network;
   receiving by a structure generation module the packets collected and classifying by the packet collection module the packets into a call setup packet and a media packet and generating a call setup information structure by analyzing information of the call setup packet if the received packet is the call setup packet, and generating a media information structure by analyzing information of the media packet if the received packet is the media packet;
   receiving by a call setup statistical information generation module the call setup information structure and generating by the structure generation module call setup statistical information by combining the call setup information structures using at least one of transmitter identification information, receiver identification information, call identification information among information of the call setup information structure as a key value;
   receiving by a media statistical information generation module the media information structure and generating by the structure generation module media statistical information by combining the media information structures using media session identification information among information of the media information structure as a key value; and
   receiving by a statistical information transmission module the generated call setup statistical information or the media statistical information and generating by the call setup statistical information generation module or the media statistical information generation module the statistical information of the network, and transmitting the statistical information to an analysis server.

9. The method of claim 8, wherein the call setup packet comprises an SIP packet and the media packet comprises an RTP packet.

10. The method of claim 8, wherein the transmitter identification information comprises transmitter URI information, the receiver identification information comprises receiver URI information, the call identification information comprises call-ID information, and the media session identification information comprises SSRC information.

11. The method of claim 8, wherein the statistical information of the network comprises a netflow.

12. The method of claim 11, wherein the netflow is a netflow following Netflow V9 format.

* * * * *